United States Patent [19]

Kostka

[11] 3,926,850

[45] Dec. 16, 1975

[54] CATALYST AND PROCESS FOR THE CONVERSION OF HIGHER HYDROCARBONS

[75] Inventor: Hana Kostka, Grossgrundlach, Germany

[73] Assignee: Siemens Aktiengesellschaft, Munich, Germany

[22] Filed: Feb. 26, 1973

[21] Appl. No.: 336,062

[30] Foreign Application Priority Data

Mar. 3, 1972 Germany............................ 2210401

[52] U.S. Cl..................... 252/455 R; 48/213; 123/3
[51] Int. Cl.²........................................... B01J 29/06
[58] Field of Search ................................ 252/455 R

[56] References Cited

UNITED STATES PATENTS

| | | | |
|---|---|---|---|
| 3,235,512 | 2/1966 | Koepernik | 252/455 R |
| 3,676,370 | 7/1972 | Stephens | 252/455 R |
| 3,776,860 | 12/1973 | Rai | 252/455 R |

*Primary Examiner*—Paul F. Shaver
*Attorney, Agent, or Firm*—Kenyon & Kenyon Reilly Carr & Chapin

[57] ABSTRACT

This disclosure is directed to a catalyst and process for converting higher hydrocarbons into mixtures containing carbon monoxide, hydrogen, methane and carbon dioxide. The catalyst comprises $\gamma$-aluminum oxide and/or $\eta$-aluminum oxide, kaolinite and a transition metal component.

18 Claims, No Drawings

CATALYST AND PROCESS FOR THE CONVERSION OF HIGHER HYDROCARBONS

The conversion of higher hydrocarbons into low-molecular weight products such as gasoline (such conversions are known as cracking processes) is usually performed by catalytic means. In the catalytic decomposition of oils, such as crude oil, for the manufacture of gasoline and similar products, natural clay or synthetic clay-silicate mixtures, for example, are used as catalysts. As disclosed in U.S. Pat. No. 2,958,648 a catalyst for the cracking of petroleum into gasoline may include silicon dioxide, aluminum oxide and magnesium oxide.

In vapor reforming of higher hydrocarbons, particularly for manufacturing hydrogen-containing gas mixtures, systems of catalysts are used, for instance, which generally contain a cracking catalyst such as nickel on a support material of $\alpha$-aluminum oxide. In the conventional processes for converting hydrocarbons the reaction temperature is in general at about 900°C and above. The conversion efficiency for the hydrocarbons used is in general below 40%.

It is an object of this invention to provide an improved catalyst for converting higher hydrocarbons into gas mixtures containing carbon monoxide, hydrogen, methane and carbon dioxide. In particular, a catalyst is provided which assures high chemical efficiency for the hydrocarbons used and which makes it possible to conduct the reaction at low temperatures.

The catalyst of this invention contains at least one of the substances $\gamma$-aluminum oxide and $\eta$-aluminum oxide as well as additionally, kaolinite and, as an active component, at least one of the transition elements of the periodic system of the elements. This catalyst makes possible a high cracking efficiency in the conversion of higher hydrocarbons into cracked gas which contains $CO$, $H_2$, $CH_4$ and $CO_2$. The reaction efficiency is in the range between 40 and 80%, depending on the reaction temperature and the loading of the catalyst. Moreover, these high efficiencies are obtained at relatively low-reaction temperatures in the range between about 500° and 600°C.

Due to the high reaction efficiency of the catalyst for the hydrocarbons used, as compared to conventional methods and catalysts, a cracked gas is obtained which can be used advantageously for the operation of domestic and industrial burners as well as of internal combustion engines, particularly in motor vehicles. The advantage of using such cracked gases is that only small amounts of harmful substances are emitted with the exhaust gas. Methods for operating internal combustion engines with cracked gas are set forth in copending U.S. Pat. applications Ser. No. 218,696, filed Jan. 18, 1972 now U.S. Pat. 3,828,736 and Ser. No. 270,923, filed July 12, 1972 now abandoned.

Higher hydrocarbons are understood to be hydrocarbons with two or more carbon atoms, particularly hydrocarbons having more than four carbon atoms. The transition metals referred to herein are the metals of the first to the eighth subgroup of the periodic system of the elements. Examples of transition metals are copper, zinc, lanthanum, titanium, vanadium, chromium, manganese, the metals of the iron group and the platinum metals.

The catalyst according to this invention is suited particularly well for the conversion of liquid paraffinic, cycloparaffinic, aromatic and olefinic hydrocarbons. It can be used, for instance, for producing a gas mixture containing $H_2$, $CO$, $CO_2$ and $CH_4$ from gasoline; the gasoline may contain, for instance, predominantly hydrocarbons with 4 to 8 carbon atoms. The oxidant used can be oxygen in pure form as well as in gas mixtures, such as air, as well as in bound form, for instance, in the form of carbon dioxide or water or steam. For this reason, the exhaust gases of the above mentioned devices, i.e., the exhaust gases of internal combustion engines, domestic and industrial burners are also suited as oxidants. The conversion of the hydrocarbons takes place particularly well in the presence of water or steam. The exhaust gases mentioned can replace the water at least in part. Oxygen, in the form of air, is particularly useful for exothermic operation.

The conversion of the hydrocarbons can take place at normal, i.e., atmospheric pressure, or at slightly increased or decreased pressure. The reaction temperature is in general between about 250° and 900°C, and preferably in the range between 500° and 600°C.

The catalyst of this invention makes possible highly efficient cracking of the hydrocarbons in a small space and with little pressure loss. Furthermore, the formation of soot during the reaction is held to a minimum.

Advantageously, the catalyst contains 5 to 90% by weight of $\gamma$—$Al_2O_3$, 5 to 80% by weight of $\eta$—$Al_2O_3$, 5 to 50% by weight of kaolinite and 0.3 to 35% by weight of an active component, always relative to the total weight of the catalyst. $\gamma$—$Al_2O_3$ has relatively many dislocations (disturbance places) and for this reason is active. The admixture of $\eta$—$Al_2O_3$, which is itself an active, catalytically effective carrier, with the $\gamma$—$Al_2O_3$ increases the activity of the catalyst considerably. The catalyst contains preferably 30 to 75% by weight of $\gamma$—$Al_2O_3$, 15 to 70% by weight of $\eta$—$Al_2O_3$, 10 to 25% by weight of kaolinite and 0.5 to 22% by weight of the active component. Catalysts with a composition in this range yield particularly high reaction efficiency, particularly at low reaction temperatures.

As the active component, the catalyst contains advantageously at least one metal of the third to eighth subgroups of the periodic system of the elements. Preferably, the catalyst contains as the active component at least one metal of the third and/or the eighth subgroup of the periodic system of the elements.

The catalyst may advantageously contain platinum as the active component. The platinum content of the catalyst is here preferably 0.6% by weight, relative to the total weight of the catalyst. Catalysts with a platinum content in the range of about 0.3 to 1% by weight exhibit very good results regarding the reaction efficiency and the reaction temperature. Only little improvement can be obtained by increasing the platinum content, but this would, on the other hand, result in an increase in cost.

The catalyst can advantageously also contain lanthanum and cobalt in the form of oxides as the active component. The content of lanthanum and cobalt in the catalyst is here preferably 9 to 10% by weight, based on the total weight of the catalyst. Lanthanum and cobalt are preferably in the catalyst in the mol ratio of about 1:1. Catalysts containing lanthanum oxide and cobalt oxide have the advantage that they are relatively inexpensive. Furthermore, they develop their catalytic activity in an oxidizing as well as in a reducing atmosphere.

The kaolinite in the catalyst advantageously contains titanium dioxide. The titanium dioxide content of the kaolinite may be 0.5 to 10% by weight, relative to the kaolinite. Advantageously, the kaolinite contains 1 to 6% by weight of titanium dioxide, and preferably 1.6% by weight. The use of titanium dioxide has the advantage that the stability of the catalyst is increased, and moreover, loss of activity is prevented by the addition of $TiO_2$. The increase in stability manifests itself especially with a $TiO_2$ content in the kaolinite of about 1 to 6% by weight; this can be explained by the fact that the $TiO_2$ has a slightly acidifying effect.

The catalyst can advantageously be manufactured by mixing aluminum oxyhydrate, in the form of Boehmite and/or Bayerite, with kaolinite; then this mixture is activated with acid and plasticized; the paste so obtained is mixed with at least one transition metal compound; and this mixture is further processed into a molding. Advantageously, kaolinite containing titanium dioxide is used. The kaolinite can furthermore advantageously be pretreated electro-osmotically. Through the electro-osmosis treatment, kaolinite of high purity is obtained; the kaolinite is thereby concentrated in the form of fine particles. The kaolinite can be processed, for instance, in the manner described in F. Ullmann, "Encyclopedia of Technical Chemistry," 2d ed., vol. 4, p. 401 and following, Verlag Urban & Schwarzenberg, Berlin-Wien, 1929.

The catalyst can be manufactured as follows: A mixture of Boehmite and Bayerite is thoroughly mixed with the kaolinite; this is then mixed with an aqueous solution of at least one inorganic acid at elevated temperature for the purpose of activation and plasticization; the paste so obtained is mixed with at least one transition metal compound in salt form; this mixture is then made into a molding; and the molding is dried and subsequently annealed. The molding can advantageously be annealed at a temperature of about 600° to 800°C; the annealing temperature is preferably about 750°C.

Boehmite and Bayerite are aluminum oxyhydrates. Boehmite AlO(OH) (or $Al_2O_3$ . $H_2O$, respectively) becomes $\gamma-Al_2O_3$ through thermal decomposition. Bayerite $Al(OH)_3$ (or $Al_2O_3$ . $3H_2O$, respectively) is made into $\eta-Al_2O_3$ through thermal decomposition. Depending on the temperature conditions however $\gamma-Al_2O_3$ can also be formed in the decomposition of Bayerite (see, for instance Chemiker-Zeitung, vol. 90, 1966, pp. 235–39). Kaolinite is a water containing aluminum silicate of the composition $Al_2O_3$ . $2SiO_2$ . $2H_2O$. Kaolinite found in nature may contain titanium dioxide $TiO_2$.

The molding can be made with a molding pressure of 30 to 300 N/mm² (Newton/millimeter²); the molding pressure is preferably about 60 N/mm². The molding can be made in such a manner that it has passage openings in the form of canals. The catalyst can also be made in an extrusion press. The mixture of aluminum oxyhydrate, kaolinite, acid and a transition metal compound can finally also be dried and annealed, and the substance obtained thereby can be ground and made into a molding in the form of balls or pellets. The catalyst can moreover also be manufactured in such a manner that a catalyst carrier, which is saturated with a solution of the active component and is subsequently subjected to a thermal treatment, is formed from aluminum oxyhydrate and kaolinite by molding and annealing.

Transition metal compounds in salt form can advantageously be used, such as metal nitrates, i.e. lanthanum nitrate and/or cobalt nitrate. Inorganic acids which can be used advantageously are nitric acid and/or hydrofluoric acid.

The acid serving for activation can be used in the following amounts: Nitric acid $HNO_3$ - 0.5 to 10% by weight and preferably 1 to 5% by weight; hydrofluoric acid HF - 0.1 to 12% by weight and preferably 0.6 to 6% by weight. The weight specifications are always referred to as 100-% acid and are relative to the total content of the catalyst of aluminum oxide $Al_2O_3$, i.e. to the $Al_2O_3$ formed from the aluminum oxyhydrate and to the $Al_2O_3$ contained in the kaolinite. In the activation with acid, the $Al_2O_3$ is slightly dissolved. In the subsequent heat treatment the salts formed in the process, for instance nitrates, are decomposed. In the process a crystal lattice with dislocations is formed, whereby increased activity is achieved.

The invention is described in further detail by the following examples.

One thousand seven hundred grams of pulverized aluminum oxyhydrate with an $Al_2O_3$ content of about 70% by weight are thoroughly mixed with 300 g of kaolinite. The aluminum oxyhydrate consists of about 78% by weight of Boehmite and 22% by weight of Bayerite. The kaolinite used, with a $TiO_2$ content of about 1.6% by weight, is pretreated electro-osmotically prior to the mixing. To the mixture obtained in this manner, diluted nitric acid is added in a kneading mill. About 400 g of 5% nitric acid are used for this purpose. This amount corresponds to about 2% by weight of 100-% $HNO_3$, relative to the total content of the mixture of aluminum oxide. The stock is plasticized and activated for about 1.5 hours at about 40° to 80°C through intensive kneading. Subsequently the paste-like substance obtained thereby is reacted with 330 g of crystalline lanthanum nitrate $La(NO_3)_3$ . $6 H_2O$ and 220 g of crystalline cobalt nitrate $Co(NO_3)_2$ . $6 H_2O$ and treated in the kneading mill for another 30 minutes. The mixture is subsequently pressed into a molding at a pressure of about 60 N/mm². The molding is dried for about 12 hours at 130°C and finally annealed for about 6 hours at a temperature of about 750°C.

The catalyst manufactured in this manner has approximately the following composition (in % by weight): 55.8% of $\gamma-Al_2O_3$; 16.0% of $\eta-Al_2O_3$; 17.0% of kaolinite; 0.3% of $TiO_2$; 7.5% of $La_2O_3$ and 3.4% of CoO. The metal content of the catalyst (La + Co) is about 9.2% by weight, relative to the total weight of the catalyst.

In the same manner, for instance, by using hexachloroplatinic (IV) acid $H_2$ [$PtCl_6$], a catalyst can be manufactured which contains about 0.6% by weight of platinum as the active component. The composition (in % by weight) is here, for instance, approximately as follows: 37.3% of $\gamma-Al_2O_3$; 55.0% of $\eta-Al_2O_3$; 7.0% of kaolinite; 0.1% of $TiO_2$ and 0.6% of Pt.

The two catalysts mentioned exhibit particularly high reaction efficiencies, even at low reaction temperatures. The favorable results which are obtained are demonstrated by the following examples.

COMPARISON TEST

Using a catalyst of conventional $\gamma-Al_2O_3$ as the carrier material with a content of 9.2% by weight of lanthanum and cobalt (in the mol ratio 1:1), relative to the total weight of the catalyst, gasoline in the form of n- heptane is cracked in the presence of water. The loading of the catalyst, the conversion of gasoline and the composition of the gas mixture obtained are listed in the following tables.

| Reaction Temperature 500°C | | | | | | | | |
|---|---|---|---|---|---|---|---|---|
| Loading | | Conversion | | Gas Composition % by Volume | | | | |
| Gasoline | Water | % by Weight | $H_2$ | CO | $CO_2$ | $CH_4$ | $C_2H_6$ | $C_xH_y$ |
| 4.22 | 1.57 | 16 | 75.0 | 2.9 | 20.7 | 1.4 | — | — |
| 2.80 | 1.09 | 22 | 72.0 | 3.9 | 19.6 | 4.4 | — | — |
| 1.39 | 0.54 | 35 | 70.5 | 4.0 | 20.0 | 5.5 | — | — |

| Reaction Temperature 600°C | | | | | | | | |
|---|---|---|---|---|---|---|---|---|
| Loading | | Conversion | | Gas Composition % by Volume | | | | |
| Gasoline | Water | % by Weight | $H_2$ | CO | $CO_2$ | $CH_4$ | $C_2H_6$ | $C_xH_y$ |
| 4.19 | 3.09 | 26 | 70.6 | 9.6 | 15.9 | 3.9 | — | — |
| 4.23 | 1.54 | 28 | 69.3 | 12.2 | 12.8 | 4.0 | 0.7 | 1.0 |
| 2.84 | 1.15 | 29 | 69.1 | 11.1 | 12.9 | 4.0 | 1.3 | 1.5 |
| 1.39 | 0.56 | 40 | 67.5 | 13.0 | 12.8 | 4.6 | 1.0 | 0.9 |

The loading is given in liters of gasoline and water, respectively, per liter of volume of the catalyst per hour. The catalyst was here in the form of extrusion moldings or honeycomb units. The formula $C_xH_y$ indicates hydrocarbons with a carbon number of three and higher.

EXAMPLE 1

A catalyst according to the invention with approximately the following composition (in % by weight): 55.8% of $\gamma$—$Al_2O_3$; 16.0% of $\eta$—$Al_2O_3$; 17.0% of kaolinite; 0.3% of $TiO_2$; 7.5% of $La_2O_3$ and 3.4% of CoO, is used for cracking gasoline in the form of n-heptane. The test results are listed in the following tables.

| Reaction Temperature 500°C | | | | | | | | |
|---|---|---|---|---|---|---|---|---|
| Loading | | Conversion | | Gas Composition % by Volume | | | | |
| Gasoline | Water | % by Weight | $H_2$ | CO | $CO_2$ | $CH_4$ | $C_2H_6$ | $C_xH_y$ |
| 4.25 | 1.68 | 45 | 76.0 | 3.0 | 19.0 | 0.8 | — | — |
| 2.24 | 1.33 | 48 | 75.0 | 3.6 | 19.0 | 0.8 | — | — |
| 1.44 | 0.55 | 63 | 74.0 | 4.2 | 19.0 | 1.6 | — | — |

| Reaction Temperature 600°C | | | | | | | | |
|---|---|---|---|---|---|---|---|---|
| Loading | | Conversion | | Gas Composition % by Volume | | | | |
| Gasoline | Water | % by Weight | $H_2$ | CO | $CO_2$ | $CH_4$ | $C_2H_6$ | $C_xH_y$ |
| 4.35 | 3.02 | 42 | 68.2 | 11.5 | 16.5 | 2.1 | 0.6 | 1.1 |
| 4.13 | 1.57 | 54 | 69.7 | 14.8 | 10.7 | 3.3 | 0.8 | 0.5 |
| 2.92 | 1.31 | 59 | 69.1 | 15.7 | 8.2 | 4.6 | 1.3 | 1.1 |
| 1.44 | 0.47 | 65 | 66.0 | 18.8 | 7.7 | 5.5 | 0.9 | 1.1 |

It is found that when the catalyst according to invention is used, the percentage of converted gasoline is substantially higher than with the use of a conventional catalyst with customary $\alpha$-$Al_2O_3$ as the carrier material.

In the cracking of gasoline, having predominantly hydrocarbons of from four to eight carbon atoms, the amount of water used may vary widely; generally from two to seven moles of water may be used for each mole of hydrocarbon, such as heptane.

EXAMPLE 2

For converting gasoline a platinum-containing catalyst can also be used which, according to the method explained in detail above, is manufactured from Boehmite, Bayerite, titanium dioxide-containing kaolinite and a platinum salt. With a catalyst which has approximately the following composition (in % by weight): 37.3% of $\gamma$—$Al_2O_3$; 55.0% of $\eta$—$Al_2O_3$; 7.0% of kaolinite; 0.1% of $TiO_2$ and 0.6% of Pt, one obtains with a reaction temperature of about 600°C and a loading of the catalyst with 4.65 liters of n-heptane per liter of catalyst per hour and 2.06 liters of water per liter of catalyst per hour, a gas mixture with approximately the following composition (in % by volume): 60.7% $H_2$; 6.5% CO; 12.3% $CO_2$; 8.3% $CH_4$ and 12.2% $C_2H_6$ and higher hydrocarbons. The conversion was 74% by weight.

EXAMPLE 3

A catalyst of the composition of Example 1 was used for the cracking of gasoline, where part of the gasoline used was burned through the addition of air in order to maintain the temperature required at the catalyst. The reaction temperature is about 600°C. About 5 to 15% by weight of the gasoline used in the form of n-heptane served for combustion. A conversion of the remaining gasoline of 72% was obtained with a loading of the catalyst of 4.13 liters of heptane and 1.57 liters of water, respectively, per liter of catalyst per hour. The resultant gas mixture had the following composition (% by volume): 50.9% $H_2$; 10.8% CO; 11.6% $CO_2$; 2.4% $CH_4$; 1.0% $C_2H_6$ and higher hydrocarbons, as well as 23.3% $N_2$ (from the air).

The tests performed show that with the use of the catalyst according to the invention, the portion of converted gasoline can be nearly 80%. In these tests the gasoline was used in the form of pure n-heptane, which, as a straight-chain hydrocarbon, is known to be relatively difficult to crack. Thus with hydrocarbons which contain branched hydrocarbons, the conversion efficiency can be increased still further.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. A catalyst for converting higher hydrocarbons into gas mixtures containing carbon monoxide, hydrogen, methane and carbon dioxide comprising γ-aluminum oxide, η-aluminum oxide, kaolinite containing titanium dioxide and an active component selected from the group conisting of platinum and the oxides of lanthanum and cobalt.

2. A catalyst according to claim 1 comprising about 5 to 90% by weight of γ-$Al_2O_3$, about 5 to 80% by weight of η-$Al_2O_3$, about 5 to 50% by weight of kaolinite and about 0.3 to 35% by weight of said active component.

3. A catalyst according to claim 2 comprising about 30 to 75% by weight of γ-$Al_2O_3$, about 15 to 70% by weight of η-$Al_2O_3$, about 10 to 25% by weight of kaolinite and about 0.5 to 22% by weight of said active component.

4. A catalyst according to claim 1 containing about 0.6% by weight of platinum, relative to the total weight of the catalyst.

5. A catalyst according to claim 1 containing about 9 to 10% by weight of lanthanum and cobalt, relative to the total weight of the catalyst.

6. A catalyst according to claim 5 containing lanthanum and cobalt in the mol ratio of about 1:1.

7. A catalyst according to claim 1 wherein the titanium dioxide content of the kaolinite is about 0.5 to 10% by weight, relative to the kaolinite.

8. A catalyst according to claim 7 wherein the kaolinite contains about 1 to 6% by weight of $TiO_2$.

9. A catalyst according to claim 8 wherein the kaolinite contains about 1.6% by weight of $TiO_2$.

10. A method for the manufacture of a catalyst comprising mixing aluminum oxyhydrates in the form of Boehmite and Bayerite, with kaolinite containing titanium dioxide, plasticizing said mixture with acid to form a paste, mixing the paste with at least one compound of platinum or cobalt and lanathanum; and molding the product.

11. A method according to claim 10 wherein the kaolinite is electro-osmotically pretreated.

12. A method according to claim 10 comprising thoroughly mixing the Boehmite and Bayerite with the Kaolinite; mixing these with an aqueous solution of at least one inorganic acid at elevated temperature to obtain a paste, mixing the paste with at least one compound of platinum or cobalt and lanathanum in salt form and pressing this mixture into a molding; drying and subsequently annealing the molding.

13. A method according to claim 12 wherein molding is made at a pressure of about 30 to 300 $N/mm^2$.

14. A method according to claim 12 wherein lanathanum nitrate and cobalt nitrate is used as the lanathanum and cobalt compound in salt form.

15. A method according to claim 12 wherein nitric acid and/or hydrofluoric acid is used as the inorganic acid.

16. A method according to claim 15 wherein 0.5 to 10% by weight of nitric acid, calculated as 100-% acid and referred to the total aluminum oxide content of the catalyst, is used.

17. A method according to claim 15 wherein 0.1 to 12% by weight of hydrofluoric acid, calculated as 100-% acid and referred to the total aluminum oxide content of the catalyst, is used.

18. A method according to claim 12 wherein the molding is annealed at a temperature of about 600° to 800°C.

* * * * *